United States Patent
Maezawa

[19]

[11] Patent Number: 6,026,066
[45] Date of Patent: Feb. 15, 2000

[54] BEAM SPOT SPEED DETECTING SYSTEM FOR AN OPTICAL DISK APPARATUS

[75] Inventor: Etsuo Maezawa, Tokyo, Japan

[73] Assignee: NEC Corporation, Tokyo, Japan

[21] Appl. No.: 08/988,187

[22] Filed: Dec. 10, 1997

[30] Foreign Application Priority Data

Dec. 16, 1996 [JP] Japan .................................. 8-335683

[51] Int. Cl.[7] .................................................. G11B 7/00
[52] U.S. Cl. ........................................................ 369/44.28
[58] Field of Search .................................. 369/32, 44.27, 369/44.28, 44.29, 44.26

[56] References Cited

U.S. PATENT DOCUMENTS

| | | | |
|---|---|---|---|
| 4,788,421 | 11/1988 | Ogawa et al. | 369/44.28 |
| 5,193,081 | 3/1993 | Osawa et al. | 369/44.28 |
| 5,220,547 | 6/1993 | Yasukawa et al. | 369/44.28 |

FOREIGN PATENT DOCUMENTS

| | | |
|---|---|---|
| 54-45184 | 4/1979 | Japan . |
| 58-91536 | 5/1983 | Japan . |
| 62-231430 | 10/1987 | Japan . |
| 1-271980 | 10/1989 | Japan . |
| 5-307844 | 11/1993 | Japan . |
| 6-36484 | 2/1994 | Japan . |

*Primary Examiner*—Nabil Hindi
*Attorney, Agent, or Firm*—Sughrue, Mion, Zinn, Macpeak & Seas, PLLC

[57] ABSTRACT

The speed detecting system 12 detects the beam spot speed relative to the optical disk 1 on the basis of track count pulses and reference clock pulses. The period of each track count pulse is the time taken in order for the beam spot to traverse a track. The reference clock pulses include first pulses, which are shorter in period than the track count pulses, and second pulses, which are longer in period than the track count pulses. In an area where the beam spot speed is low, the reference clock count method for counting the number of first pulses per track count pulse is used. In an area where the beam spot speed is high, the traverse count method for counting the number of track count pulses per second pulse is used.

18 Claims, 3 Drawing Sheets

BEAM SPOT SPEED DETECTING SYSTEM FOR AN OPTICAL DISK APPARATUS

FIELD OF THE INVENTION

The present invention relates to a beam spot speed detecting system for use with an optical disk apparatus, which records and/or reproduces information optically with an optical disk or another recording/reproducing medium, in order to detect the speed of the beam spot during seek control for positioning the spot on a target track at high speed with accuracy.

BACKGROUND OF THE INVENTION

FIG. 3 is a functional block diagram of a conventional optical disk apparatus including a conventional speed detecting system.

This apparatus includes a spindle motor 3 for rotating an optical disk 1 having concentric or spiral tracks. The apparatus also includes an optical head 2 for reproducing information by radiating a beam spot on an information track of the disk 1. The apparatus further includes means 4–11 and the detecting system 21.

The means 4 is a head positioning means for moving the optical head 2 radially of the disk 1. The means 5 is a tracking error signal detector for generating a tracking error signal which represents the positional displacement of the beam spot on the disk 1. The means 6 is follow-up control means for constituting a follow-up control loop by feeding the tracking error signal back to the head positioning means 4 so that the beam spot follows a desired track. The means 7 is a track count pulse generator for forming, out of the tracking error signal, square waves (track count pulses) which cycle as tracks are traversed. The means 8 is a track counter. When the beam spot seeks a desired track, the number of tracks to be traversed is input as an initial value into this counter 8. Thereafter, the counter 8 subtracts in accordance with the track count pulses, and generates a target track drawing or pull-in timing signal after the remaining tracks are zero in number. The detecting system 21 is a period measurement type speed detecting system for detecting the relative speed of the beam spot with respect to the disk 1 by measuring the period during which a track is traversed. The means 9 is a target speed command means for commanding the relative speed of the head 2 in accordance with the value from the track counter 8. The means 10 is an error signal generator for outputting a difference signal based on signals from the speed detecting system 21 and target speed command means 9. The means 11 is a control loop switch. In order for the beam spot to follow a desired track, this switch 11 switches between the follow-up control loop that feeds the tracking error signal back to the head positioning means 4 and the speed control loop that feeds the output from the error signal generator 10 back to the positioning means 4, switching at the best timing for positioning on a target track, when seek starts, and when the value from the track counter 8 is zero.

The speed detecting system 21 will be described below in detail. Hereinafter, the relative speed of the beam spot means refers to the beam spot speed relative to the disk 1.

The speed detecting system 21 includes a reference clock generator 13' for generating a single clock having a frequency which can be as high as the highest frequency of the track count pulses. A counter 17' counts the output from the clock generator 13'. A latch 18' latches the count from the counter 17'. A set/reset controller 16' outputs a set signal for latching the value from the counter 17' for each cycle of the track count pulses and a reset signal for clearing, immediately after latching the value, the initial value of the counter 17'. A period/speed converter 20' outputs values proportional to the frequencies of the tracking error signal by converting the value latched by the latch 18'.

The output from the clock generator 13', which oscillates at a constant period, is latched by the latch 18' in accordance with the period of the tracking error signal detected by the detector 5 when the beam spot has traversed a track. When the period at which a track is traversed is short, that is to say, when the relative speed of the beam spot is high, a small value is latched. When the period at which a track is traversed is long, that is to say, when the relative speed of the spot is low, a large value is latched. Consequently, the latched values are inversely proportional to the speeds. Therefore, the speed detecting system 21 outputs the latched values after converting them into values proportional to the speeds by using the period/speed converter 20'.

The optical disk apparatus fitted with the speed detecting system 21 controls the speed of the beam spot in accordance with an optimum speed locus, and positions it on a target track.

A first problem with the conventional system is that the speed detector circuitry is large in scale and the production costs are high. The reason for this is that the period measurement type speed detector and the differentiation type speed detector are used together.

A second problem is that, the circuitry of the period measurement type speed detector is large in scale. The reason for this is that the count for a low speed movement area is huge, so that a multi-bit counter is needed, and the amount of operations of the period/speed converter is large.

A third problem is that the period measurement type speed detector needs to operate at high speed, and at the same time the power consumption increases. A reason for this is that the circuitry operates with a basic clock of a frequency which is some times as high as the maximum frequency of the track count pulses. Another reason is that the periods of the track count pulses in the high speed movement area are short, so that it is necessary to perform the operation of the period/speed converter at high speed.

A fourth problem is that, assuming that the speed detector is an F/V converter (which generates pulses of constant width with one edge of each track count pulse, passes the pulses through an integrating circuit, and thereafter equalizes them to be analog output), which may include a monostable multivibrator, the dynamic range and/or the accuracy of detection are/is not sufficient for speed detection for seek control and accurate positioning at high speed. The reason for this is that the traverse frequencies during a long distance seek, range over a wide band, and that the acceleration is large when a speed changes, so that the speed is not detected with accuracy.

A fifth problem is that it is difficult to match, with the differentiation type speed detector and the F/V converter, the values generated by the target speed command means and/or the period measurement type speed detector. The reason for this is that the target speed command means and the period measurement type speed detector operate with digital data, while the differentiation type speed detector and the F/V converter detect analog values and therefore necessitate adjustment for speed conversion.

SUMMARY OF THE INVENTION

It is a primary object of the present invention to provide a speed detecting system which can solve the foregoing problems in the prior art by reducing the maximum count (range of count), thereby simplifying the circuitry and shortening the processing time.

A speed detecting system according to the invention includes a reference clock generator, which generates two reference clocks of different frequencies. A count pulse switch outputs the higher frequency clock in a low speed control area and outputs track count pulses in a high speed control area. A set/reset pulse switch outputs track count pulses in the low speed control area and the lower frequency clock in the high speed control area. A set/reset controller controls the reset of a counter and the latching of a latch with edges of set/reset pulses. The counter counts the number of count pulses input between the set/reset pulse edges. The latch latches or holds the count of the counter at each set/reset pulse edge. A comparator controls the count pulse switch and the set/reset pulse switch in accordance with the count. A period/speed converter selects one of two methods of speed detection by the value output from the comparator, and computes or processes the count by the selected method.

In the optimum speed locus control of the speed of the beam spot relative to the optical disk, which is the speed control loop of the optical head by the head positioning means, the speed detecting system selects the reference clock count method in the low speed control area, according to which the lower the speed is, the larger the count is. Similarly, for the traverse count method in the high speed control area, the higher the speed is, the larger the count is. This reduces the maximum count (range of count). Circuits other than the count pulse switch and the set/reset pulse switch are used together. It is therefore possible to detect the speed sufficiently with simple circuitry in comparison with the prior art.

BRIEF DESCRIPTION OF THE DRAWINGS

A preferred embodiment of the present invention is shown in the accompanying drawings, in which:

FIG. 2 shows relative speeds of the beam spot; FIG. 2 shows counts by the reference clock count method; FIG. 2 shows counts by the traverse count method; FIG. 2 shows counts by the speed detecting system; FIG. 2 shows speeds detected by this detecting system;

DETAILED DESCRIPTION OF THE PREFERRED EMBODIMENT

Figure 1:
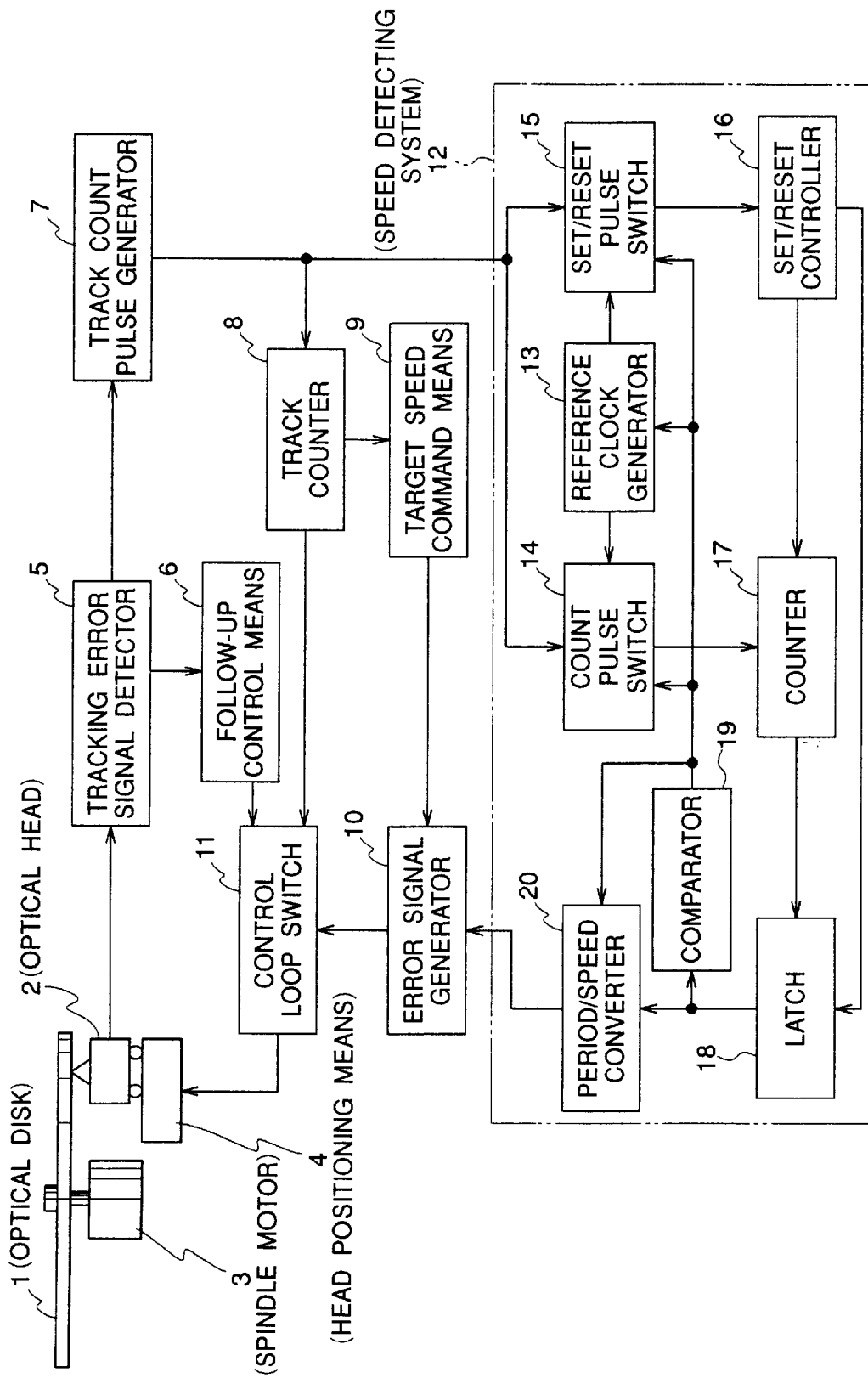
FIG. 1 is a functional block diagram of an optical disk apparatus including a speed detecting system according to a preferred embodiment.
Figure 3:
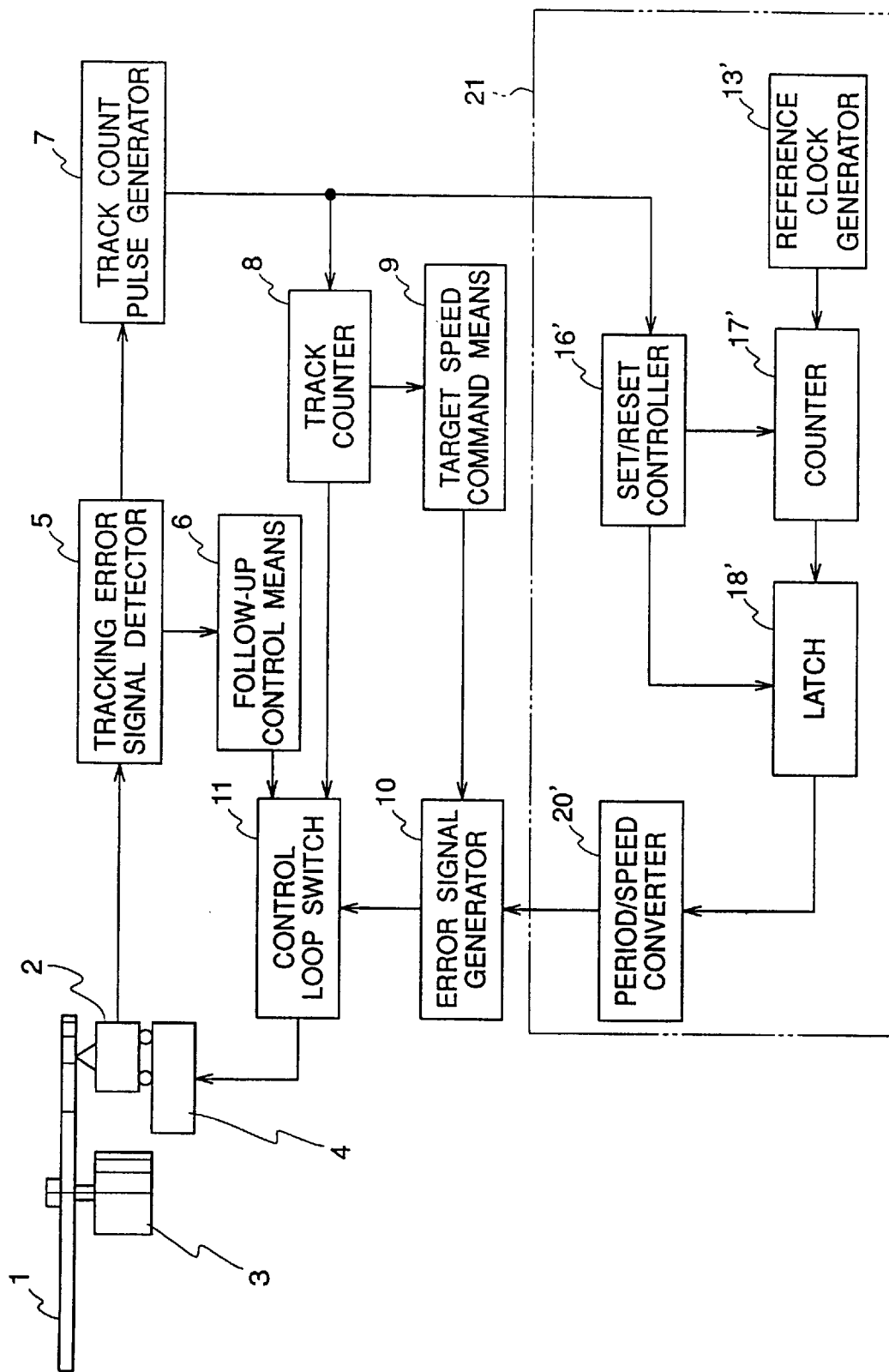
FIG. 3 is a functional block diagram of an optical disk apparatus including a conventional speed detecting system.

In FIG. 1, the components identical to those in FIG. 3 are designated with the same numerals to avoid repeating the descriptions.

With reference to FIG. 1, a speed detecting system 12 includes a reference clock generator 13, which generates two reference clocks of different frequencies. A count pulse switch 14 outputs the higher frequency clock in a low speed control area and track count pulses in a high speed control area. A set/reset pulse switch 15 outputs track count pulses in the low speed control area and the lower frequency clock in the high speed control area. A set/reset controller 16 controls the reset of a counter 17 and the latching of a latch 18 with edges of set/reset pulses. The counter 17 counts the number of count pulses input between the set/reset pulse edges. The latch 18 latches or holds the count of the counter 17 at each set/reset pulse edge. A comparator 19 controls the switch 14 and 15 in accordance with the count. A period/speed converter 20 selects one of two methods of speed detection by the value output from the comparator 19, and computes or processes the count by the selected method.

That is to say, the speed detecting system 12 is of the period measurement switching type for detecting the relative speed of the optical head 2 by switching between the methods and measuring the period at which a track is traversed.

The optical disk apparatus fitted with the speed detecting system 12 controls the speed of the beam spot in accordance with the optimum speed locus, and positions the spot on a target track.

Figure 2:
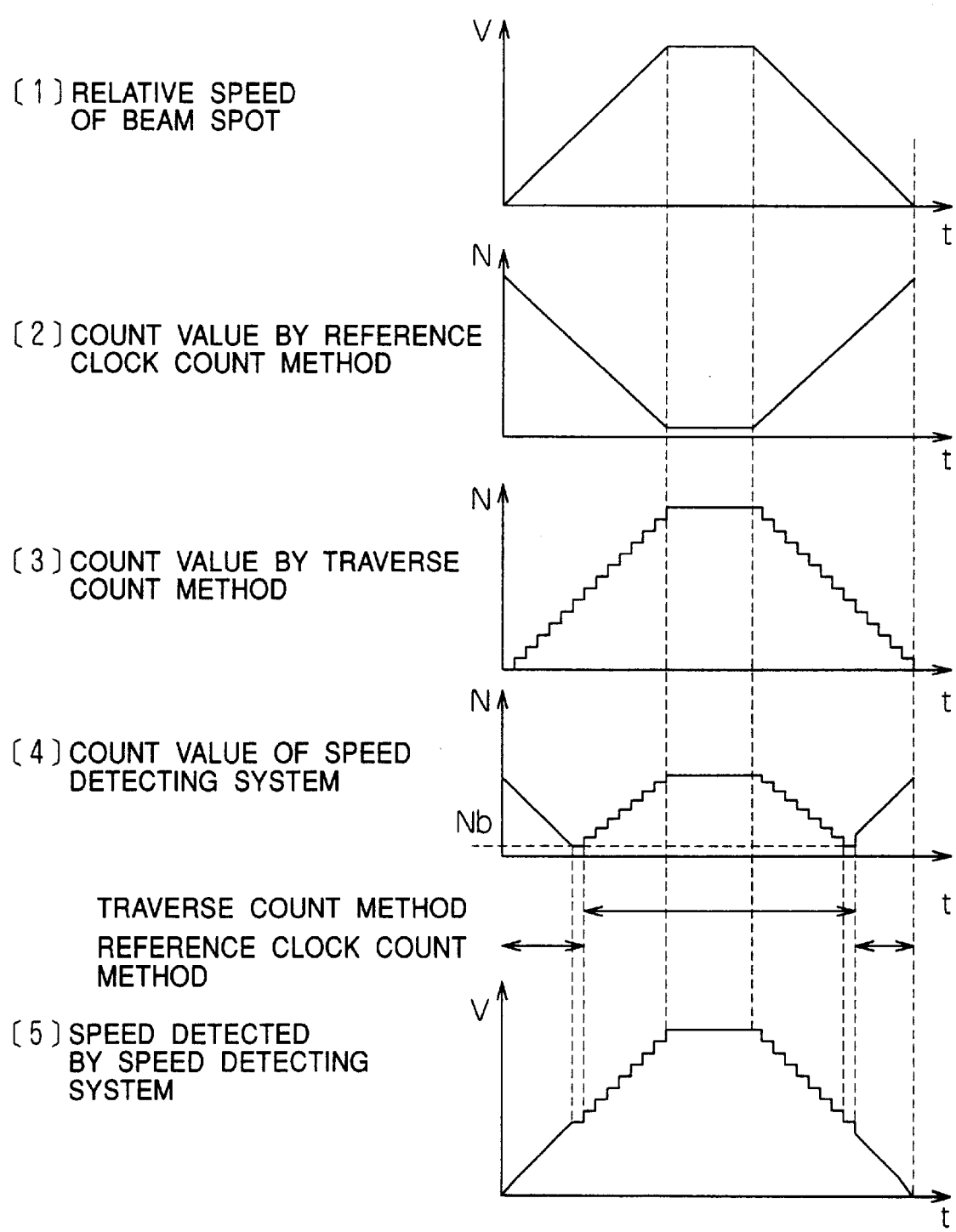
FIG. 2 is a waveform diagram showing examples of operation of the speed detecting system shown in FIG. 1.

With reference to FIGS. 1 and 2, it is assumed that, during a seek operation, the relative speed of the beam spot seen by the target speed command means 9 changes as shown in FIG. 2, and the spot has been positioned on a target track by controlling the optical head 2.

FIG. 2 shows the counts in a case where the speed is detected by the reference clock count method during the whole process of a seek operation.

The reference clock count method includes latching the shorter-period output from the clock generator 13 (the count of the counter 17) at half the period (or n/2[n:natural number]) of the tracking error signal detected by the tracking error signal detector 5 when the beam spot has traversed a track or a space between tracks. If the period of the error signal is short, that is to say, if the relative speed of the spot is high, a small value is latched. If this period is long, that is to say, if the speed is low, a large value is latched. Therefore, as illustrated, the latched values are inversely proportional to the speeds.

FIG. 2 shows the counts in a case where the speed is detected by the traverse count method during the whole process of seek operation.

The traverse count method includes latching, at half the period of the longer-period output from the clock generator 13, the tracking error signal (the count of the counter 17) detected by the detector 5 when the beam spot has traversed a track. If the period of the error signal is short, that is to say, if the relative speed of the spot is high, a large value is latched. If this period is long, that is to say, if the speed is low, a small value is latched. Therefore, as illustrated, the latched values are directly proportional to the speeds.

Accordingly, for the track pitch P, count N, and reference clock periods T1 and T2 (T1<T2), the speed detected by the reference clock count method is 2×P/(N×T1), and the speed detected by the traverse count method is 2×N×P/T2. The period/speed converter 20 calculates the relative speed by executing the foregoing operations, or storing the speed for the count N in advance and reading out the stored count.

FIG. 2 shows the counts by the speed detecting system 12 in a case where the reference clock count method and the traverse count method are used together.

The speed detecting system 12 is set to operate by the reference clock count method immediately after seek starts. The comparator 19 in a seek operation compares the value from the latch 18 and a preset threshold Nb at all times. Therefore, the count decreases as the detected speed rises, as shown with the relative speed of the beam spot in FIG. 2.

When the count is equal to or smaller than the threshold Nb, the comparator 19 outputs a signal (high speed control area signal) for switching to the traverse count method to the count pulse switch 14, the set/reset switch 15 and the period/speed converter 20. Thereafter, the count in the high speed control area is always larger than the threshold Nb, but decreases with the detected speed as a target track is approached.

When the count is again equal to or smaller than the threshold Nb, the comparator 19 outputs a signal (low speed control area signal), for switching back to the reference clock count method, to the count pulse switch 14, the set/reset switch 15 and the period/speed converter 20.

Accordingly, by executing the foregoing operation for the detected counts, it is possible to obtain the detected speeds by the speed detecting system 12 which are shown in FIG. 2.

The optical disk apparatus shown in FIG. 1 cooperates with the speed detecting system 12 as follows.

A follow-up control loop is constituted by the optical disk 1, the spindle motor 3 for rotating the disk 1, the optical head 2 for reproducing information by radiating a beam spot on an information track formed on the disk 1, and the means 4, 5, 6 and 11.

The means 4 is a head positioning means for moving the optical head 2 radially of the disk 1. The means 5 is a tracking error signal detector for generating a tracking error signal which represents the positional displacement of the beam spot on the disk 1. The means 6 is a follow-up control means for constituting a follow-up control loop by feeding the output from the tracking error signal detector 5 back to the head positioning means 4 so that the head 2 follows a desired track in accordance with the tracking error signal. The means 11 is a control loop switch for switching between the follow-up control loop and a speed control loop.

If, when the beam spot is controlled to follow a track, the number of tracks from this track to a desired track to be accessed is input into the track counter 8, and is transmitted to the target speed command means 9, then a command is transmitted to the control loop switch 11, which then switches from the follow-up control loop to the speed control loop.

The target speed command means 9 outputs to the error signal generator 10 a command for the relative speed of the beam spot with respect to the disk 1 in accordance with the input number of tracks. The generator 10 generates the difference between the detected speed output from the period/speed converter 20 and the target speed output from the command means 9, and outputs it through the control loop switch 11 to the head positioning means 4.

In the speed control loop, the comparator 19 selects the reference clock count method if the relative speed of the beam spot with respect to the disk 1 is low, and the traverse count method if this speed is high. The period/speed converter 20 converts the count into a detected speed.

When the optical head 2 and head positioning means 4 start to move the beam spot toward the target track, the tracking error signal generated from the tracking error signal detector 5 is shaped into binary track count pulses by the track count pulse generator 7. The track counter 8 subtracts, from the track counter (with the initial value being the number of tracks between the present and target tracks) the number of tracks traversed in accordance with the track count pulses. Accordingly, as the target track is approached, the target speed command means 9 reduces the target speed in proportion to the square root of the distance to the target track.

At the best point for reaching the target track after the value of the track counter of the track counter 8 is zero, the means 8 outputs to the control loop switch 11 a timing signal for switching from the speed control loop to the follow-up control loop. The relative speed of the beam spot on the target track is controlled to be a speed at which the spot can be drawn or pulled stably into the track. Therefore, by switching to the follow-up control loop in accordance with the timing signal, the target track is reached and the seek operation is completed.

As stated hereinbefore, the optical disk apparatus fitted with the speed detecting system 12 controls, during seek, the speed of the optical head 2 by either the reference clock count method or the track count method in accordance with the optimum relative speed locus output from the target speed command means 9 until a target track is reached. This makes it possible to draw the beam spot into the target track with the relative speed being stable on the track. It is therefore possible to position the head 2 over the target track by performing seek operation once.

This reduces the time taken to read in the address of the track to be reached when the beam spot is out of the target track, and the time needed for re-seek. It is therefore possible to shorten the access time.

The speed detecting system uses the reference clock count method in the low speed control area, in which the count is larger for a lower speed, and the traverse count method in the high speed control area, in which the count is larger for a higher speed. This can reduce the maximum count (range of count), thereby simplifying the circuitry and shortening the processing time without lowering the accuracy of detection. By using together circuits other than the count pulse switch and the set/reset pulse switch, it is possible to process all signals digitally from the track count pulse generator to the error signal generator. It is therefore possible to achieve the foregoing more effectively. The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 8-335683 (Filed on Dec. 16, 1996) including specification, claims, drawings and summary are incorporated herein by reference in its entirety.

What is claimed is:

1. A detecting system for detecting a speed of a beam spot of an optical disk apparatus relative to an optical disk set on the apparatus, comprising:

a period detector for detecting a track count period of each of a plurality of track count pulses, the track count period being a time taken in order for the beam spot to traverse a track of the optical disk;

a reference clock generator for generating reference clock pulses including first and second pulses each having fixed periods, the period of the first pulses being shorter than periods of the track count pulses, the period of the second pulses being longer than periods of the track count pulses when the speed is higher than a predetermined value; and a speed detector that selects one of two methods of speed detection of a beam spot speed, the two methods being a reference clock count method for counting a number of first pulses for each of the track count pulses in a time where the speed is less than or equal to the predetermined value and a traverse count method for counting a number of track count pulses for each of the second pulses in the time where the speed is higher than the predetermined value.

2. A detecting system according to claim 1, the speed detector comprising:

a count pulse switch for outputting the first pulses as count pulses when a low speed control area signal is input thereinto, and outputting the track count pulses as count pulses when a high speed control area signal is input thereinto;

a set/reset pulse switch for outputting the track count pulses as set/reset pulses when the low speed control area signal is input thereinto, and outputting the second pulses as set/reset pulses when the high speed control area signal is input thereinto;

a counter for counting a number of count pulses for each of the set/reset pulses, and outputting the counted number as a count;

a latch for latching the count for each of the set/reset pulses and outputting the count;

a set/reset controller for controlling with the set/reset pulses a reset of the counter and the latching of the latch;

a comparator for outputting either the low speed control area signal or the high speed control area signal depending on the count; and a period/speed converter for receiving the count, and computing the beam spot speed on the basis of the count according to the reference clock count method when the low speed control area signal is input thereinto and according to the traverse count method when the high speed control area signal is input thereinto.

3. A method of detecting, on the basis of track count pulses and reference clock pulses, a relative speed of a beam spot of an optical disk apparatus with respect to optical disk set on the apparatus;

a period of each of the track count pulses being a time for the beam spot to traverse a track of the optical disk;

the reference clock pulses including first and second pulses each having fixed periods, the period of the first pulses being shorter than periods of the track count pulses, the period of the second pulses being longer than periods of the track count pulses when the speed is higher than a predetermined value;

the method comprising the steps of:

counting according to a reference clock count method, wherein a number of first pulses is counted for each of the track count pulses, during a time where the beam spot speed is less than or equal to the predetermined value; and counting according to a traverse count method, wherein a number of track count pulses is counted for each of the second pulses, during a time where the beam spot speed is greater than the predetermined value.

4. A detecting system according to claim 1, wherein a pitch of the tracks of the optical disk is P, the counted number of first pulses being N1, the counted number of track count pulses being N2, the period of the first pulses being T1, the period of the second pulses being T2;

the reference clock count method including counting a number of first pulses for half of each of the track count pulses, and calculating the beam spot speed $V=2\times P/(N1\times T1)$;

the traverse count method including counting a number of track count pulses for half of each of the second pulses, and calculating the beam spot speed $V=2\times N2\times P/T2$.

5. A detecting system according to claim 2, wherein a pitch of tracks of the optical disk is P, the counted number of first pulses being N1, the counted number of track count pulses being N2, the period of the first pulses being T1, the period of the second pulses being T2;

the reference clock count method including counting a number of first pulses for half of each of the track count pulses, and calculating the beam spot speed $V=2\times P/(N1\times T1)$;

the traverse count method including counting a number of track count pulses for half of each of the second pulses, and calculating the beam spot speed $V=2\times N2\times P/T2$.

6. A method according to claim 3, wherein a pitch of tracks of the optical disk is P, the counted number of first pulses being N1, the counted number of track count pulses being N2, the period of the first pulses being T1, the period of the second pulses being T2;

the reference clock count method including counting a number of first pulses for half of each of the track count pulses, and calculating the beam spot speed $V=2\times P/(N1\times T1)$;

the traverse count method including counting a number of track count pulses for half of each of the second pulses, and calculating the beam spot speed $V=2\times N2\times P/T2$.

7. A detecting system according to claim 1, wherein a pitch of tracks of the optical disk is P, the counted number of first pulses being N1, the counted number of track count pulses being N2, the period of the first pulses being T1, the period of the second pulses being T2, natural number being n;

the reference clock count method including counting a number of first pulses for n/2 of each of the track count pulses, and calculating the beam spot speed $V=2\times n\times P/(N1\times T1)$;

the traverse count method including counting a number of track count pulses for n/2 of each of the second pulses, and calculating the beam spot speed $V=2\times n\times N2\times P/T2$.

8. A detecting system according to claim 2, wherein a pitch of tracks of the optical disk is P, the counted number of first pulses being N1, the counted number of track count pulses being N2, the period of the first pulses being T1, the period of the second pulses being T2, natural number being n;

the reference clock count method including counting a number of first pulses for n/2 of each of the track count pulses, and calculating the beam spot speed $V=2\times n\times P/(N1\times T1)$;

the traverse count method including counting a number of track count pulses for n/2 of each of the second pulses, and calculating the beam spot speed $V=2\times n\times N2\times P/T2$.

9. A method according to claim 3, wherein a pitch of the tracks of the optical disk is P, the counted number of first pulses being N1, the counted number of track count pulses being N2, the period of the first pulses being T1, the period of the second pulses being T2, natural number being n;

the reference clock count method including counting a number of first pulses for n/2 of each of the track count pulses, and calculating the beam spot speed $V=2\times n\times P/(N1\times T1)$;

the traverse count method including counting a number of track count pulses for n/2 of each of the second pulses, and calculating the beam spot speed $V=2\times n\times N2\times P/T2$.

10. A detecting system according to claim 1, wherein the predetermined value represents an average speed of the beam spot.

11. A detecting system according to claim 2, wherein the comparator outputs the speed control area signal depending on the count, such that:

the comparator outputs the low speed control area signal when the beam spot speed is less than or equal to the predetermined value; and the comparator outputs the high speed control area signal when the beam spot speed is over the predetermined value;

the predetermined value being an average speed of the beam spot.

12. A method according to claim 3, wherein the predetermined value represents an average speed of the beam spot.

13. A detecting system according to claim 10, wherein a pitch of tracks of the optical disk is P, the counted number of first pulses being N1, the counted number of track count pulses being N2, the period of the first pulses being T1, the period of the second pulses being T2;

the reference clock count method including counting a number of first pulses for half of each of the track count pulses, and calculating the beam spot speed $V=2\times P/(N1\times T1)$;

the traverse count method including counting a number of track count pulses for half of each of the second pulses, and calculating the beam spot speed $V=2\times N2\times P/T2$.

14. A detecting system according to claim 11, wherein a pitch of tracks of the optical disk is P, the counted number of first pulses being N1, the counted number of track count pulses being N2, the period of the first pulses being T1, the period of the second pulses being T2;

the reference clock count method including counting a number of first pulses for half of each of the track count pulses, and calculating the beam spot speed $V=2\times P/(N1\times T1)$;

the traverse count method including counting a number of track count pulses for half of each of the second pulses, and calculating the beam spot speed $V=2\times N2\times P/T2$.

15. A method according to claim 12, wherein a pitch of tracks of the optical disk is P, the counted number of first pulses being N1, the counted number of track count pulses being N2, the period of the first pulses being T1, the period of the second pulses being T2;

the reference clock count method including counting a number of first pulses for half of each of the track count pulses, and calculating the beam spot speed $V=2\times P/(N1\times T1)$;

the traverse count method including counting a number of track count pulses for half of each of the second pulses, and calculating the beam spot speed $V=2\times N2\times P/T2$.

16. A detecting system according to claim 10, wherein a pitch of tracks of the optical disk is P, the counted number of first pulses being N1, the counted number of track count pulses being N2, the period of the first pulses being T1, the period of the second pulses being T2, natural number being n;

the reference clock count method including counting a number of first pulses for n/2 of each of the track count pulses, and calculating the beam spot speed $V=2\times n\times P/(N1\times T1)$;

the traverse count method including counting a number of track count pulses for n/2 of each of the second pulses, and calculating the beam spot speed $V=2\times n\times N2\times P/T2$.

17. A detecting system according to claim 11, wherein a pitch of tracks of the optical disk is P, the counted number of first pulses being N1, the counted number of track count pulses being N2, the period of the first pulses being T1, the period of the second pulses being T2, natural number being n;

the reference clock count method including counting a number of first pulses for n/2 of each of the track count pulses, and calculating the beam spot speed $V=2\times n\times P/(N1\times T1)$;

the traverse count method including counting a number of track count pulses for n/2 of each of the second pulses, and calculating the beam spot speed $V=2\times n\times N2\times P/T2$.

18. A method according to claim 12, wherein a pitch of tracks of the optical disk is P, the counted number of first pulses being N1, the counted number of track count pulses being N2, the period of the first pulses being T1, the period of the second pulses being T2, natural number being n;

the reference clock count method including counting a number of first pulses for n/2 of each of the track count pulses, and calculating the beam spot speed $V=2\times n\times P/(N1\times T1)$;

the traverse count method including counting a number of track count pulses for n/2 of each of the second pulses, and calculating the beam spot speed $V=2\times n\times N2\times P/T2$.

* * * * *